United States Patent [19]

Schilling et al.

[11] Patent Number: 4,565,427

[45] Date of Patent: Jan. 21, 1986

[54] DEVICE FOR THE RAPID ADJUSTMENT OF MICROSCOPE STAGES

[75] Inventors: Albert Schilling, Aalen; Wolfgang Schob, Oberkochen, both of Fed. Rep. of Germany

[73] Assignee: Carl-Zeiss-Stiftung, Heidenheim, Fed. Rep. of Germany

[21] Appl. No.: 546,201

[22] Filed: Oct. 27, 1983

[30] Foreign Application Priority Data

Nov. 18, 1982 [DE] Fed. Rep. of Germany ....... 3242523

[51] Int. Cl.$^4$ ............................................. G02B 21/26
[52] U.S. Cl. .................................... 350/530; 350/518
[58] Field of Search ......................... 350/530, 529, 518

[56] References Cited

U.S. PATENT DOCUMENTS 3,180,161  4/1965  Wasner ................................. 350/530
3,895,770  7/1975  Yoshida et al. ...................... 350/530
3,997,239  12/1976  Scherzer ............................. 350/530

*Primary Examiner*—John K. Corbin
*Assistant Examiner*—Loha Ben

*Attorney, Agent, or Firm*—Hopgood, Calimafde, Kalil, Blaustein & Judlowe

[57] ABSTRACT

The invention contemplates provision of an additional selectively adjustable transmission mechanism, in the coupling of a microscope stage to focusing mechanism within the microscope stand. In the disclosed embodiment, the stage is mounted to a stage carrier (7) which is guided in the stand, and the additional transmission is provided between the stage carrier and the output rack (5) of the primary rack-and-pinion coupling of the focusing mechanism for the stage. The focusing mechanism is of the coaxial coarse-fine variety, with output to the pinion (4) of the coupling. In the additional transmission, an eccentric (11) is journaled for selective rotation in the stage carrier (7), the rack (5) of the coupling has an independent vertical guidance relation (9) with the stage carrier (7), and the rack (5) and eccentric (11) coact to establish instantaneous relative elevation of the stage (6) with respect to the rack (5). Adjustment-knob control of the eccentric enables a short cycle of stage displacement, through selective stage-carrier elevation, independent of instantaneous coarse-fine focusing adjustment.

10 Claims, 3 Drawing Figures

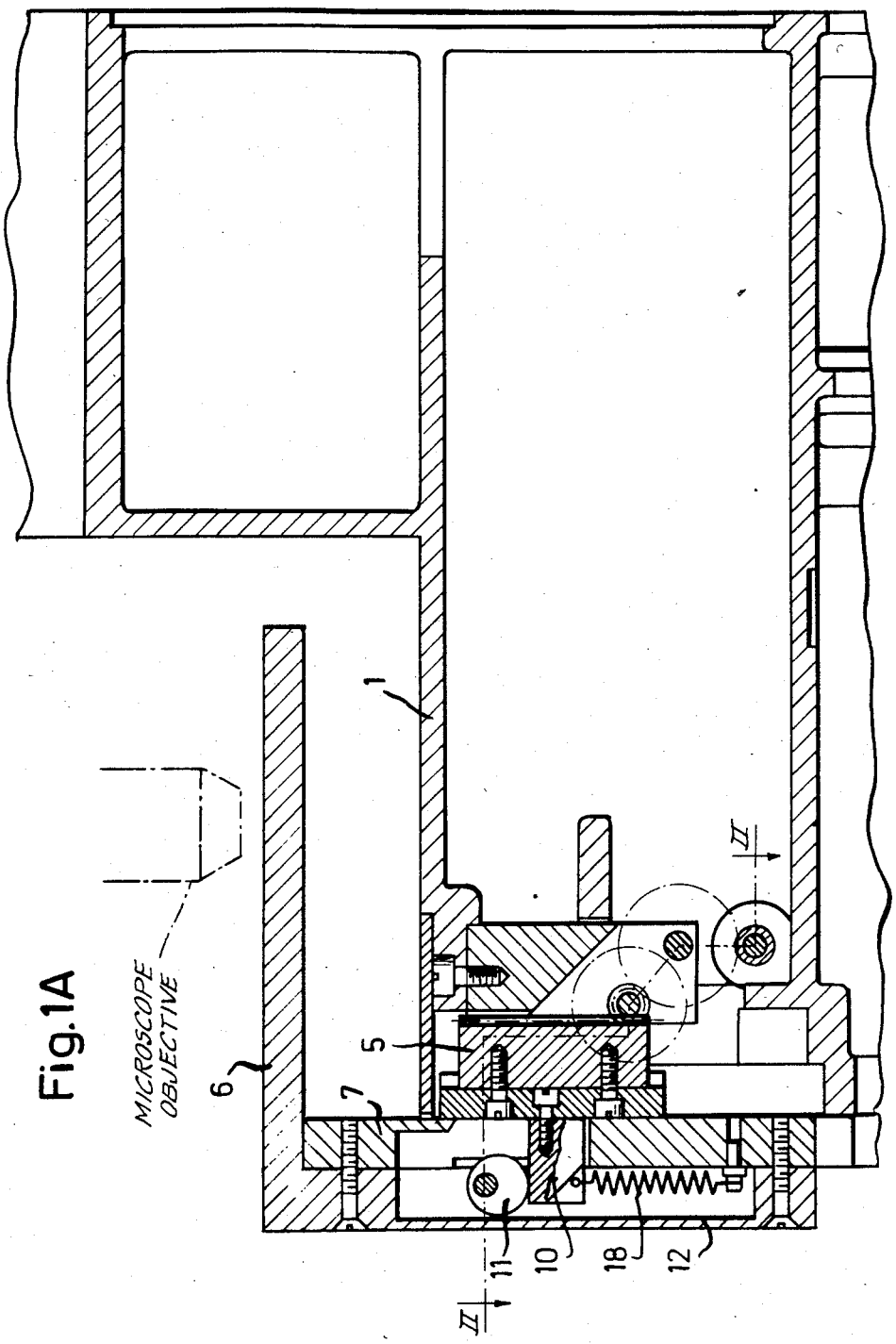

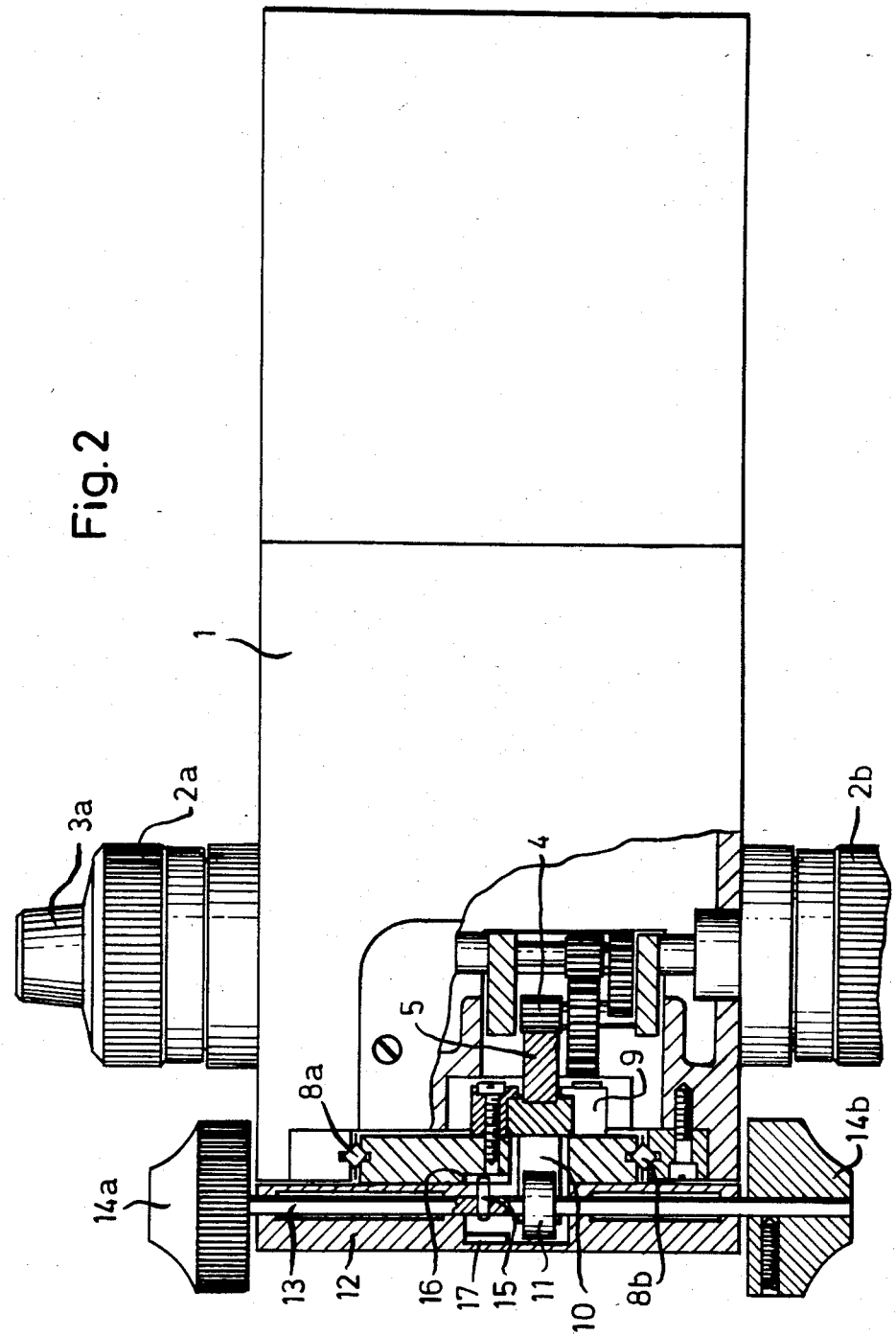

DEVICE FOR THE RAPID ADJUSTMENT OF MICROSCOPE STAGES

BACKGROUND OF THE INVENTION

The invention relates to a device for rapid adjustment of microscope stages, using an additional transmission which is arranged between the focusing drive and the stage, and by means of which the stage is lowered or raised a predetermined amount.

Illustratively, such devices are needed to provide a certain safety spacing between the stage (which is vertically adjustable, for focusing) and the objective of the microscope, with the capability, after replacement of the specimen, to move back immediately into the correct working distance. In this connection, it is not necessary that the focal plane of the microscope be precisely reached again; however, it should at least be possible to see an image of the object on which one can focus easily, i.e., without having to seek it.

Such devices facilitate work with specimens of different thickness if the stroke of the rapid adjustment device corresponds to the difference in thickness, from one to the next-successive specimen.

For rapid adjustment of a microscope stage, West German Pat. No. 1,221,031 discloses a device which uses an angle lever which is mounted in the stationary part of the microscope stand. This lever displaces the point of support of a reduction-lever transmission which is arranged between a fine-displacement drive and a separate coarse-displacement drive and thus displaces the stage vertically by a predetermined amount.

However, the device of this German patent cannot be readily used if the focusing drive of the microscope is developed as coaxial coarse and fine drives, with a common driven pinion. Furthermore, it has the disadvantage that the reduction transmission strikes its stop relatively harshly upon lowering via the rapid adjustment lever. This gives rise to vibrations and, in the long term, damages the focusing drive.

Swiss Pat. No. 526,118 discloses two embodiments of another device for the rapid adjustment of microscope stages, both embodiments being interposed between a coaxial coarse-fine drive and a displaceable stage.

In the first embodiment, the device consists of a differential transmission arranged between the driven pinion of the focusing drive and a rack on a stage carrier. Such an intermediate transmission is, however, relatively expensive and increases the price of a thus-equipped microscope.

The second embodiment uses an eccentric which is mounted in the stationary part of the stand and which vertically displaces the pivot point of a lever which connects the focusing-drive rack to the stage carrier. This embodiment has the disadvantage, on the one hand, that it is necessary to provide within the stand two guides whose length extends over the entire range of adjustment of the focusing drive. On the other hand, this lever transmission only operates satisfactorily if the angle of swing of the lever is not too great. This device is therefore not well-suited for focusing drives which have a relatively large stroke since, in such cases, the lever must be made very long, with the result that the distance between the stage and the focusing drive becomes relatively great, and the device itself assumes unwieldy dimensions.

BRIEF STATEMENT OF THE INVENTION

The object of the present invention is to provide a compact device of simplest construction for the rapid adjustment of microscope stages; more specifically, the object is to provide such a device which can be easily accommodated between the focusing drive and the stage carrier.

This object is achieved by provision of an additional selectively adjustable transmission mechanism, in the coupling of a microscope stage to focusing mechanism within the microscope stand. In the disclosed embodiment, the stage is mounted to a stage carrier (7) which is guided in the stand, and the additional transmission is provided between the stage carrier and the output rack (5) of the primary rack-and-pinion coupling of the focusing mechanism for the stage. The focusing mechanism is of the coaxial coarse-fine variety, with output to the pinion (4) of the coupling. In the additional transmission, an eccentric (11) is journaled for selective rotation in the stage (6), the rack (5) of the coupling has an independent vertical guidance relation (9) with the stage carrier (7), and the rack (5) an eccentric (11) coact to establish instantaneous relative elevation of the stage (6) with respect to the rack (5).

Such an arrangement affords various advantages. On the one hand, the existing focusing drive of the microscope can be retained unchanged. And for microscopes already in use, installation changes to effect the improvement need be made only on the stage carrier.

Furthermore, only one main guide is required for the stage carrier. The rack is supported in an auxiliary guide which makes few demands as to precision, and the length of the rack need merely correspond to the stroke of the rapid adjustment. The eccentric assures gentle action with only slight expenditure of force in the initial portion of an adjustment motion.

It is advantageous to substantially relieve the stage/stage-carrier load on the eccentric by providing a spring which reacts between the stage carrier and the rack, in the direction and to a degree which almost fully offsets such a load. By this measure, particularly easy-action adjustment via the eccentric is assued. At the same time, the entire weight of the stage acts on gear mechanism of the focusing drive, which is thus made free of play.

Preferably, a stop is provided to limit rotation of the eccentric. The stop assures reproduction of well-defined end positions of the stage, after a cycle of actuation of the rapid-adjustment device.

DETAILED DESCRIPTION

A preferred embodiment of the invention will be described in detail, in conjunction with the accompanying drawings, in which:

FIG. 1A is a vertical sectional view through the part of a microscope stand which contains the stage adjustment;

FIG. 1B is an enlarged fragmentary view of rack and pinion components of FIG. 1A and FIG. 2 is a plan view of the structure of FIG. 1A, partly broken-away and in section along the line II—II of FIG. 1A.

In the drawings, the lower part of the stand of a vertical microscope is designated 1. Within stand 1, the focusing drive of the microscope is mounted, which drive, as shown in FIG. 2, is provided on its two lateral sides with coarse-drive adjustment knobs 2a and 2b, respectively, coaxially arranged with arespect to fine-drive adjustment knobs 3a and 3b (not shown). The construction of this gearing will not be described in detail, but it is helpful to identify the driven pinion 4 which is common to coaxial coarse and fine components of the drive. Pinion 4 meshes with a rack 5, which is connected to a microscope stage 6, in the manner to be described.

The stage 6 is secured to a stage carrier 7 which is vertically adjustable in stand 1 by means of a main guide 8a-8b. And this stage carrier 7 mounts an auxiliary guide 9, in which rack 5 is guided for vertical displacement with respect to the carrier 7.

A follower lug or nose 10 secured to rack 5 extends through an opening in the stage carrier 7. An eccentric 11 is fixed to a shaft 13 which is mounted for rotation in a vertical part 12 of the stage 6, and eccentric 11 is in riding contact with nose 10. Shaft 13 is equipped with actuating knobs 14a and 14b at its respective ends.

A pin 15 fixed to shaft 13 assures well-defined end positions of shaft rotation; this pin limits rotation at stop 16 in the stage 6 and at stop 17 in the stage part 12, respectively. The weight of stage 6 is in part directly transmitted to the nose 10 of rack 5 via a spring 18, thus reducing the load or contact pressure which the eccentric 11 would otherwise exert on nose 10; at the same time, the friction between these two parts is also reduced.

Upon rotation of the driven pinion 4 of the focusing drive, the rack 5, the stage 6 and all other parts 7 to 18 carried thereby are displaced vertically, in infinitely variable manner. If the focusing drive is not actuated, then rack 5 (due to its automatic locking as a result of the high reduction ratio of the focusing transmission) retains its positive relative to the stand 1. Upon selective rotation of eccentric 11, the stage 6 can now be lowered or raised rapidly a predetermined amount, by turning one of the knobs 14a–14b. The stage carrier 7 is thereby displaced with respect to rack 5, being guided by the auxiliary guide 9.

There are no special requirements as to quality of the auxiliary guide 9 (for rack 5) in the stage carrier 7, since the same precision roller-guide system 8a-8b directly provides stage-carrier (7) guidance in stand 1, in both focusing and rapid-adjustment phases of operation.

What is claimed is:

1. In a microscope stand having a vertical guide and a stage guided thereby, with stage-positioning rack-and-pinion coupling of the stage to a focusing drive in the stand, for selective elevational positioning of the stage, the improvement in which (a) an eccentric is journaled for selective rotation in the stage, (b) the rack of said coupling has vertically guided displaceability with respect to the stage, and (c) the eccentric and the rack coact to establish instantaneous relative elevation of the stage with respect to the rack.

2. The improvement of claim 1, in which spring means vertically reacting between the stage and the rack is stressed to at least in part relieve the gravitational load transmitted via the stage to the eccentric at the region of eccentric coaction with the rack.

3. The improvement of claim 1, in which the focusing drive in the stand includes rotary coarse-adjustment and fine-adjustment means both of which have geared connection to the pinion of said coupling.

4. In combination, a microscope stand, a stage in vertically guided relation to said stand, first stage-elevation adjustment mechanism comprising a rack in vertically guided relation with said stage and a pinion meshing with said rack and journaled for rotation in said stand, and second stage-elevation adjustment mechanism comprising an eccentric journaled for rotation in said stage and in vertically reacting engagement with a part of said rack.

5. The combination of claim 4, in which said first stage-elevation adjustment mechanism is the focusing drive of the microscope and includes a reduction-gear train to said pinion.

6. The combination of claim 4, in which said eccentric is in vertically downward reacting engagement with the part of said rack.

7. The combination of claim 6, in which spring means vertically reacting between said stage and said rack relieves the gravitational load of said stage on said rack.

8. The combination of claim 4, in which said eccentric is mounted to a shaft having rotary actuation access at opposite sides of said stage.

9. The combination of claim 8, wherein stop means associated with shaft rotation limits such rotation to substantially the fractional rotation involved in the full range of eccentric-throw displacement of said stage with respect to said rack.

10. The combination of claim 6, in which said rack has a toothed vertical side in mesh with said pinion and in which a lug carried at the opposite vertical side has a horizontal surface in engagement with said eccentric.

* * * * *